Feb. 1, 1944.  A. SIMMON  2,340,623
COMBINATION VIEW AND RANGE FINDER
Filed Jan. 30, 1942  3 Sheets-Sheet 1
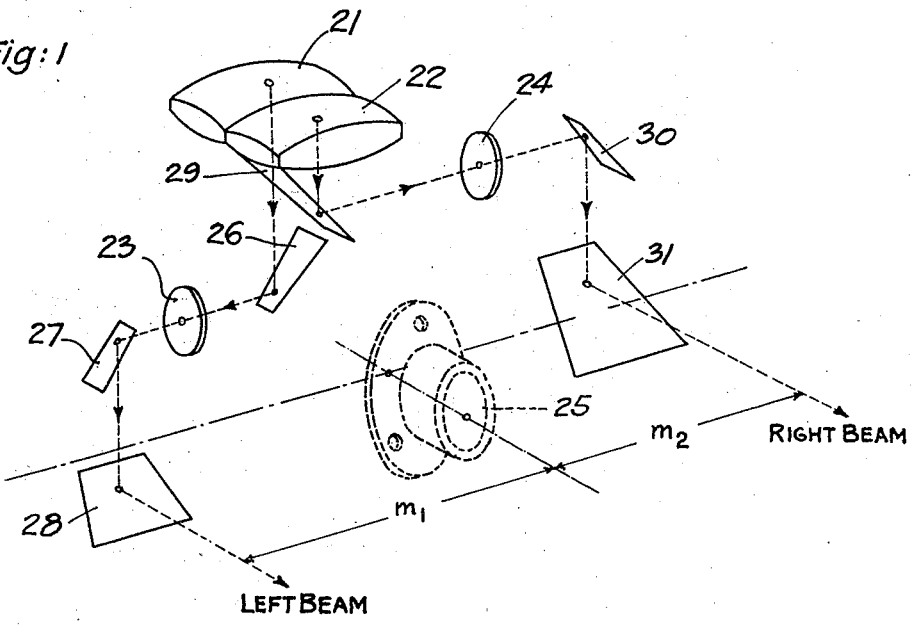
Fig: 1
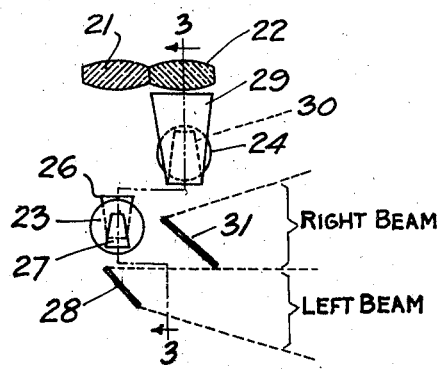
Fig: 2
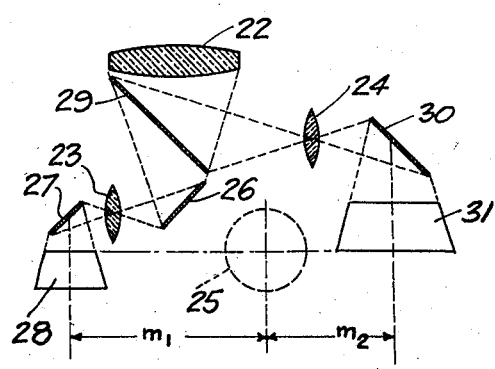
Fig: 3
INVENTOR:
Alfred Simmon
BY Walter E. Wollheim
ATTORNEY.

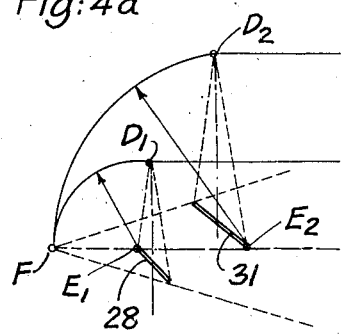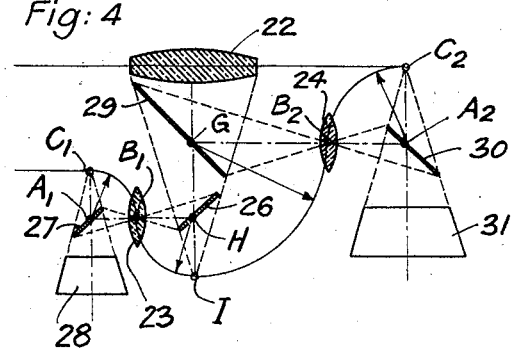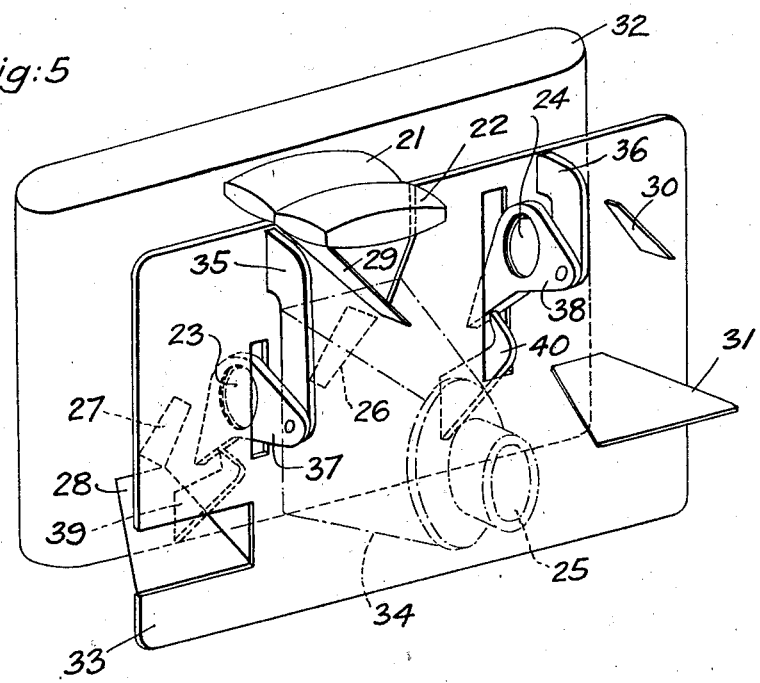

Feb. 1, 1944. A. SIMMON 2,340,623
COMBINATION VIEW AND RANGE FINDER
Filed Jan. 30, 1942 3 Sheets-Sheet 3
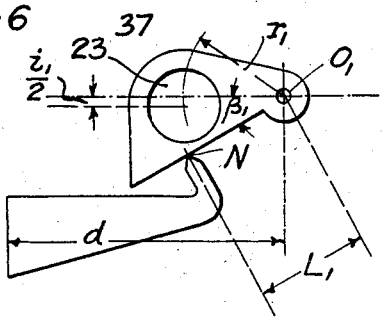
Fig:6
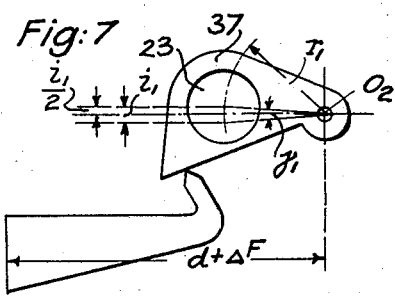
Fig:7
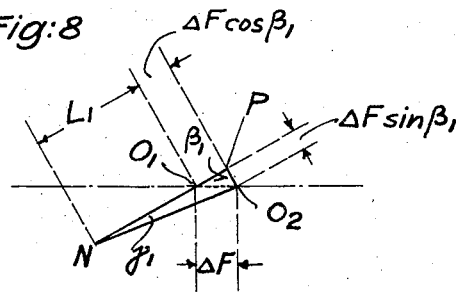
Fig:8
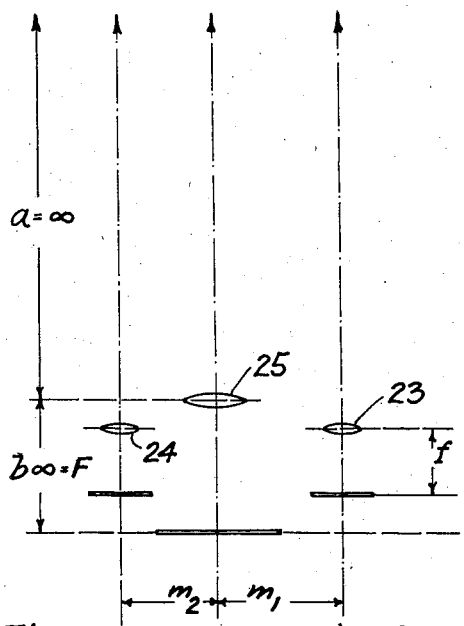
Fig:9
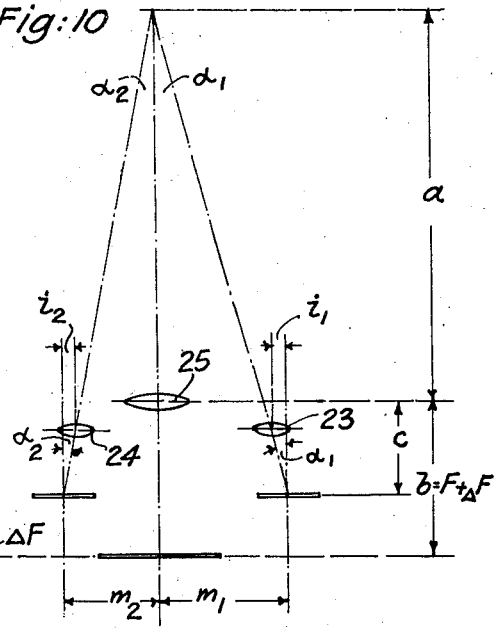
Fig:10
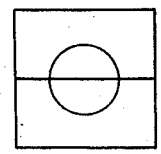
Fig:11
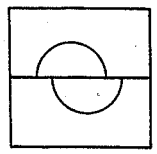
Fig:12
INVENTOR:
Alfred Simmon
BY Walter E. Wollheim
ATTORNEY.

Patented Feb. 1, 1944

2,340,623

UNITED STATES PATENT OFFICE 2,340,623

COMBINATION VIEW AND RANGE FINDER

Alfred Simmon, Jackson Heights, N. Y.

Application January 30, 1942, Serial No. 428,799

13 Claims. (Cl. 95—44)

View finders for photographic cameras are of two general types which may be called the "telescopic" and the "reflex" type.

The telescopic type consists of a telescopic system of either the Galilei or the astronomic type in conjunction with a suitable image erecting element. Since the angle covered by a photographic camera is usually far in excess of the angle covered by a typical telescopic instrument, the magnification ratio of the instruments used as view finders is usually less than 1. These instruments are strictly monocular and the observer's eye must be brought as close to the ocular lens as physically possible.

View finders of the reflex type consist of at least one image forming lens and at least one reflecting surface usually arranged under a 45° angle behind this lens. In the oldest type, the image is projected on a horizontal ground glass and in this case, the camera lens itself is sometimes used as a finder lens, as for instance, in the well known reflex camera. The ground glass absorbs a great deal of light and the image is, therefore, not very bright. Particularly under adverse light conditions it is difficult to distinguish details. This finder can be considerably improved by omitting the ground glass and substituting for it a large magnifying lens, the so-called field lens. A finder of this type is known as a "Brilliant" finder and produces an extremely bright image.

Many photographers prefer finders of the reflex, and particularly of the "Brilliant" type to all others. They facilitate considerably the proper composition of the picture prior to making the exposure and in this respect are superior to finders of the telescopic type, particularly in conjunction with larger cameras. Optically speaking, they differ from the telescopic type described above by the fact that the eye of the observer is relatively far away from the finder and this distance is usually the normal reading distance which, depending upon the eyesight of the observer, is in the neighborhood of 10". If properly designed, these finders permit the operator to view the finder image simultaneously with both eyes which seems to explain the ease with which they can be operated.

In addition to the view finder, modern cameras are equipped with a range finder so that the operator can focus at the desired object quickly and conveniently. Two images of the object to be photographed as seen from two points spaced apart a suitable distance, namely, the base distance of the range finder, are combined by optical means, and the focusing movement of the lens is mechanically synchronized with the range finder in such a way that a sharp image of the object is projected on the surface of the sensitized film whenever the two part images as seen in the range finder are in register. The two part images are either superimposed by means of half-transparent mirrors or the image is split into two supplementing parts which have to be brought in register along a parting line. Images superimposed by means of half-transparent mirrors are liable to look confusing and the so-called "split image coincidence" type is therefore usually considered preferable.

A view finder of the telescopic type can be converted into or combined with range finders without great difficulty and particularly the parting line between the two split images does not offer any great problem since the eye of the observer is always positioned with a high degree of accuracy in the center line of the optical system. The parting line between the two part images will, therefore, in telescopic view finders always appear as a straight and stationary line.

Since the view finders of the reflex and particularly of the "Brilliant" type are so much to be preferred to view finders of the telescopic type, attempts have been made to convert Brilliant type view finders into range finders. The image was split by providing a pair of crossing mirrors somewhere in the optical system, usually under the field lens of the view finder. These attempts have not been successful in practice since it is impossible in this manner to make the parting line between the two part images stationary and independent of small movements of the observer's head. The parting line between the two part images should be a straight line, preferably passing the center of the picture. In practice it will appear as a straight line only if the observer uses one eye only and if this eye is positioned on the center line of the view finder with a high degree of accuracy. As soon as the eye of the observer departs ever so slightly from this center line, the parting line ceases to appear as a straight line and assumes a more or less pronounced "S" curvature, and depending on the direction in which the eye of the observer deviates from the center line, the two parts of the "S" curve will be concave and convex, respectively, either in one direction or the other. This is disconcerting enough, but if the observer uses both eyes it becomes a great deal worse because the range finder then presents two sets of split images, respectively, to the two eyes of the observer and these two sets of split images have differently formed parting lines which upon the slightest movement of the observer's head perform wild gyrations. The result is a most unsatisfactory, apparently blurred, image which is most annoying, and extended use of such a device will give the operator a severe headache.

It is the principal object of my invention to provide a view and range finder of the "Brilliant" type which is free from this difficulty. I accomplish this by no longer using a common field lens for both part images but by providing two complete optical systems with their own image forming lenses and particularly with their own field lenses. In this manner two supplementing parts of the object to be photographed can be shown in two adjacent areas of the view finder. These two part images can be viewed by both eyes of the observer simultaneously. The parting line between the part images stays absolutely steady and the head of the observer can move several inches both forwardly and backwardly and right and left without being disturbed by a floating and wildly gyrating parting line.

Additional objects will become apparent after a perusal of the following specification supplemented by the accompanying drawings in which Fig. 1 is a diagrammatic perspective view of the lenses and mirrors of a preferred form of finder embodying the principles of the invention, in which also the camera lens is shown in dotted lines;

Fig. 2 is a side view of the same;

Fig. 3 is a front view of the same;

Fig. 4 is a front view similar to Fig. 3 showing the same elements and illustrating the conditions which must be met to make the total length of both beams equal;

Fig. 4a is a side view supplementing Fig. 4;

Fig. 5 is a perspective view, more or less diagrammatical, of a camera equipped with this view and range finder showing particularly the beam deviating device by means of which the coincidence of the two part images and the focusing of the camera lens are synchronized;

Fig. 6 shows details of the beam deviating device in the infinity position;

Fig. 7 shows similar details in a close-up position.

Fig. 8 is a diagram essential for the derivation of the geometrical formula for the correct dimensions of the parts constituting the beam deviating device;

Fig. 9 is a diagrammatic plan view of the camera lens and the two finder lenses in the infinity position, the reflecting system being omitted for the sake of clearness;

Fig. 10 is a view similar to Fig. 9 but in a close-up position.

Fig. 11 shows the field of view of the finder looking at a round object when correctly focused; and Fig. 12 shows the field of view when out of focus, indicated by the fact that the two part images of the finder, picturing supplementing parts of the object, are out of register.

Like characters of reference denote similar parts throughout the several drawings and the following specification.

The finder consists of two complete optical systems for either of the two part images. Referring to Fig. 1, the optical system for the finder for the lower (from the observer's viewpoint) part image consists of field lens 21, image forms lens 23, and reflectors 26, 27 and 28. In the same way, the system for the upper part image consists of field lens 22, image forms lens 24, and reflectors 29, 30 and 31. It will be clear that the two field lenses must have the same focal length and the two image forming lenses must have the same focal length, and the reflecting surfaces must be disposed in such a way that the two pencils of rays are of exactly the same length. Only after these conditions are met will the two part images of a given object be of identical size.

It is of advantage in a finder of this type that only simple and therefore inexpensive lenses are necessary. The field lens is essentially a magnifier and its focal length should be slightly longer than the focal length of the image forming lens. The field lens should have ordinary spherical surfaces so that the magnification ratio in the horizontal direction is the same as in the vertical direction. At least one side of the ordinarily round lens must be ground off and the lenses should be mounted in such a way that the two sides formed in this manner are adjacent. In practice, of course, all four sides will be ground off so that the field lenses have a rectangular shape. The image forming lenses are also simple positive lenses either bi-convex or, preferably, plane-convex, with the convex surface facing the observer, causing distortion to be somewhat minimized by this expedient.

In Figs. 1, 2 and 3, image forming lens 23 is disposed between mirrors 26 and 27, and image forming lens 24 is disposed between mirrors 29 and 30. This is a preferred construction since it results in the largest base distance of the finder, but it is perfectly conceivable to arrange, for example, lens 23 between mirrors 27 and 28, and lens 24 between mirrors 30 and 31; or I may provide one lens arranged with its optical axis horizontally as shown, and the other lens with its axis vertically as not shown. Any of these arrangements will result in a workable range finder, and the appended claims are to include such modifications within their scope.

Figs. 4 and 4a illustrate the conditions for equal beam lengths as applied to the preferred construction of the range finder, but it will be understood that similar constructions may apply to range finders having the lenses arranged differently such as described above.

Fig. 4 shows a front view of the range finder and a simplified diagram of a corresponding side view in Fig. 4a.

Image forming lenses 23 and 24 have, as explained above, the same focal length. Assuming that mirrors 26 and 29 be removed, lenses 23 and 24 may be replaced by lenses which in the front view of the device will be placed at point I. Consequently we must make, as shown in Fig. 4, distance HI equal distance $HB_1$, and distance GI equal distance $GB_2$.

The optical center of lens 23 is $B_1$. If we remove mirror 27 and shift lens 23 from point $B_1$, the location and size of the left beam emanating from the range finder will obviously remain unaltered. Point $C_1$ corresponds to point $D_1$ in the diagrammatical side view in Fig. 4a.

A similar construction can be made for lens 24, i. e., if we assume that mirror 30 be removed and lens 24 be shifted from $B_2$ to $C_2$, the right beam emanating from the range finder will remain unaltered. Point $C_2$ is represented in the diagrammatic side view in Fig. 4a by point $D_2$.

In Fig. 4a we have now points $D_1$ and $D_2$ representing the optical centers of the image forming lenses after the assumed removal of mirrors 27 and 30, respectively. Consequently diverging beams of rays emanate from points $D_1$ and $D_2$ and are reflected by mirrors 28 and 31.

After being reflected by mirrors 28 and 31 the two beams should cover supplementing parts of the object to be photographed.

Obviously if we now assume that mirror 28 is omitted and if point $D_1$ is shifted to point F, the location and shape of the lower or left beam will remain unaltered. In the same way, if we assume that mirror 31 is removed and point $D_2$ is shifted to point F, the shape and location of the upper or right beam also remains unaltered. It will be clear that as soon as the two circles described about points $E_1$ and $E_2$, respectively, intersect the extension of line $E_1$—$E_2$ in the same point F, as shown, the two pencils of rays will have exactly the same length, and will show supplementing parts of the object to be photographed.

Fig. 5 shows a perspective view of the camera equipped with this view and range finder. This camera consists of two main parts, the rear part 32, which contains the sensitive film and possibly a focal plane shutter, and the front part, 33. The front part consists essentially of a flat plate carrying the camera lens 25, shown in dotted lines, the various optical elements of the range finder such as shown in Figs. 1, 2 and 3, and possibly a lens shutter. The two main parts are connected by flexible, but light tight means, such as bellows 34 which are also shown by dotted lines. It will be understood that many parts which are necessary for the proper operation of the camera, but which do not form part of this invention, are not shown in this drawing. For example, no focusing device is shown, which may consist of the conventional rack and pinion movement, and the front part 33 with all parts mounted thereto will be protected in reality by a suitable cover provided with apertures for the field lenses 21 and 22, the camera lens 25, and the two pencils of rays emanating from mirrors 28 and 31.

Provisions must be made to deviate the two beams of light of the range finder in such a way that the two part images of a given object supplement each other whenever the camera lens is focused sharply on the same object. This can be done in more than one way, for example, with reference to Fig. 4, by rotating mirrors 27 and 30 around points $A_1$ and $A_2$ respectively. In practice, however, I prefer to shift lenses 23 and 24 parallel to themselves by means which I am about to describe.

With reference to Fig. 5, two brackets, 35 and 36, are mounted on plate 33. These brackets support pivots on which lens holders 37 and 38 are rotatably mounted. Knife edges and proper supporting mounts 39 and 40 are attached to the rear part of the camera part 32, and springs (not shown in the drawings) bias lens holders 37 and 38 in such a way that their lower inclined surfaces are always in contact with knife edges 39 and 40, respectively.

The beam deviating mechanism for the left beam is shown in detail in Figs. 6 and 7 in the infinity position and in a close-up position, respectively. The lens holder 37, holding lens 23, swivels around an axis which in the infinity position, Fig. 6, is located at point $O_1$. The inclined surface on the lower edge of the lens holder rests on the knife edge at point N and, in the infinity position, line $O_1N$ comprises an angle $\beta_1$ with the optical axis of the camera lens. The distance $O_1N$ (the effective length of the lens holding lever 37) is called $L_1$.

If we shift the lens from the infinity position to a position where it is focused at a relatively close point, as illustrated in Fig. 7, the fulcrum of the lens holder 37 shifts from point $O_1$ to point $O_2$. Point $O_2$ is farther removed from the sensitive film than point $O_1$ and we may call this increment $O_1O_2 = \Delta F$. This movement causes the lens holder 37 to rotate slightly, and we shall call the angle of rotation $\gamma_1$.

The distance of the center of the finder lens from the fulcrum of the lens holder is $r_1$. The slight rotation of the lens holder causes the center of the lens to be lifted by a distance $i_1$ and it will be clear that $$i_1 = r_1 \times \gamma_1 \qquad \text{(Equation 1)}$$

Theoretically, the lens should be lifted in a straight line, but since angle $\gamma_1$ is very small, the movement which really takes place on an arc does not deviate appreciably from a straight line. The best approximation, of course, can be obtained if we divide the distance $i_1$ by which the lens is lifted into two equal parts, $$\frac{i_1}{2}$$

and arrange the lens in such a way that in the infinity position it is positioned $$\frac{i_1}{2}$$

below the horizontal line passing through point $O_1$ and in the extreme close-up position position elevated by an equal distance $$\frac{i_1}{2}$$

above this horizontal line.

A diagram can now be drawn as in Fig. 8 containing points N, $O_1$ and $O_2$. By extending line $NO_1$ and drawing a line perpendicular to this extension through point $O_2$ we obtain point P. As explained above, distance $O_1O_2$ equals $\Delta F$ and distance $NO_1$ equals $L_1$. Angle $PO_1O_2$ equals $\beta_1$ and angle $O_1NO_2$ equals $\gamma_1$. We can therefore derive from triangle $PO_1O_2$ the following equations:

$$PO_2 = \Delta F \sin \beta_1$$
$$PO_1 = \Delta F \cos \beta_1$$

Similarly, contemplating triangle $PNO_2$ we obtain:

$$PN = L_1 + \Delta F \cos \beta_1$$

$$\tan \gamma_1 = \frac{\Delta F \sin \beta_1}{L_1 + \Delta F \cos \beta_1} \qquad \text{(Equation 2)}$$

How large the distance $i_1$ must be made can best be seen from the diagram in Figs. 9 and 10. These diagrams show schematically the three lenses, i. e., the camera lens 25 and the two finder lenses 23 and 24 in the respective positions which they would assume if we would omit the entire reflecting system. The two field lenses are also, for sake of clearness, not shown. It will be apparent that by omitting this reflecting system the size of the two finder images will not be changed at all, but it would, of course, be impossible to have the two part images of the finders immediately adjacent to each other which is essential in order to enable the operator to judge whether they are in proper register.

The three lenses are shown in Fig. 9 in the infinity position. A point on the center line of the camera lens in the infinite distance would, of course, be projected onto three points on the center lines of the three lenses respectively and in their respective image planes. 41 is the image plane of the camera lens 25; 42 and 43 are the image planes formed by the two finder lenses 23 and 24, respectively.

If we focus this arrangement at a point relatively close to the camera as shown in Fig. 10, a point at a distance $a$ from the optical center of the camera lens will again be projected on a point on the center line of the camera lens and in the image plane of the camera lens. The same point, however, would no longer be projected onto points in the optical axes of the two finder lenses and in order to restore this condition we have to shift the finder lenses by the distance $i_1$ and $i_2$ as shown in Fig. 10. Therefore, if we shift the two finder lenses parallel to themselves by these distances $i_1$ and $i_2$ the point on the optical axis of the camera lens in the distance $a$ from the camera lens will again be projected on points on the respective optical axes of the finder lenses and in the respective image planes of the finder lenses. If we now add the reflector system of the finder such as shown in Fig. 1, the two finder images will become again adjacent to each other and the two part images will picture supplementing parts of the object on which we focus in proper registration.

As can be seen from Fig. 1, the two optical axes of the two finders are displaced by distances $m_1$ and $m_2$, respectively, from the optical axis of the camera lens. The sum $m_1+m_2$ is the base distance of the finder. It will also be understood from Fig. 10 that $$\tan \alpha_1 = \frac{m_1}{a+c}$$

(distance $c$ is the distance by which the image plane of the finder lenses would be behind the optical center of the camera lens if we assume that the reflective system of the finder is temporarily omitted).

The focal length of the finder lenses is $f$, and we have, therefore, the following relation:

$$\tan \alpha_1 = \frac{i_1}{f}$$

The two equations for tang $\alpha_1$ may be combined to read:

$$\frac{i_1}{f} = \frac{m_1}{a+c}$$

Substituting $r_1 \gamma_1$ for $i_1$ (Equation 1), we obtain:

$$\frac{r_1}{f} \cdot \gamma_1 = \frac{m_1}{a+c}$$

$\gamma_1$ is always small and therefore with a high degree of accuracy the same as tang $\gamma_1$. We can therefore take $\gamma_1$ from Equation 2:

$$\frac{r_1}{f} \cdot \frac{\Delta F \sin \beta_1}{(L_1 + \Delta F \cos \beta_1)} = \frac{m_1}{a+c}$$

if we solve this equation for $a$ we obtain $$a = \frac{m_1 f \cdot L_1}{r_1 \sin \beta_1} \cdot \frac{1}{\Delta F} + \frac{m_1 f}{r_1 \tan \beta_1} - c \quad \text{(Equation 3)}$$

The same distance $a$ can also be computed from the optical equations for the main camera lens. The distance from the optical center of the camera to the object on which it is sharply focused has been called $a$. The corresponding distance from the optical center of the camera lens to the sensitive surface of the film shall be called $b$. The focal length of the lens itself is $F$. In the infinity position we have, of course, $b=F$, but in any other position $b$ will be larger than $F$ and we have already called the increment $\Delta F$, so that generally we have $b=F+\Delta F$. The general equation for the main camera lens is, of course:

$$\frac{1}{a} + \frac{1}{b} = \frac{1}{F}$$

This can be transformed as follows:

$$\frac{1}{a} = \frac{1}{F} - \frac{1}{b} = \frac{b-F}{b \times F} = \frac{F+\Delta F - F}{(F+\Delta F) \times F} = \frac{\Delta F}{(F+\Delta F) \times F}$$

$$a = \frac{F^2}{\Delta F} + F \quad \text{(Equation 4)}$$

The two Equations 3 and 4 derived for the distance $a$ can be reconciled if we make at all times:

$$F = \frac{m_1 f}{r_1 \tan \beta_1} - c$$

$$F^2 = \frac{m_1 f \cdot L_1}{r_1 \sin \beta_1}$$

These two equations may be solved for $$\tan \beta_1 = \frac{f}{r_1}\left(\frac{m_1}{F+c}\right)$$

$$L_1 = \frac{r_1}{f} \cdot \frac{F^2}{m_1} \cdot \sin \beta_1$$

It will be clear that identical equations can be derived for the other finder lens, i. e.:

$$\tan \beta_2 = \frac{f}{r_2} \times \left(\frac{m_2}{F+c}\right)$$

$$L_2 = \frac{r_2}{f} \cdot \frac{F^2}{m_2} \cdot \sin \beta_2$$

In other words, if we dimension the two lens holder levers in such a way that their effective lengths in the infinity position are $L_1$ and $L_2$, respectively, and that the inclined surfaces cooperating with the two knife edges comprise the angles $\beta_1$ and $\beta_2$, respectively, with the center line of the main camera lens, the finder will show supplementing parts of the object on which we focus in proper register, and the view finder will be completely and inherently free from parallax with respect to the plane on which the camera is focused.

The foregoing fully so reveals the principles of the invention that others can, by applying current knowledge of the prior art, readily adapt them for various utilizations and styles of cameras, and therefore such adaptations should be, and are intended to be, comprehended within the meaning and range of equivalency of the appended claims.

Although I have described a beam deviating device shifting the image forming lenses of both finder systems, it will be clear that this is merely a preferred construction, because it permits the elimination of parallax completely. Under certain circumstances it may be possible or desirable to simplify this design and keep one finder lens stationary and merely shift the other one; complete elimination of parallax is, of course, impossible then, but the resulting simplification may offset this disadvantage. The formulas derived above for L and $\beta$ can then still be applied, but $m$, of course, would then be the entire base distance of the range finder.

Many other changes may be found expedient and still fall within the claims.

What I claim as new, is:

1. In a photographic camera, a front part and a back part adjustable with respect to each other, a camera lens fastened to said front part, a combination range and view finder fastened to said front part consisting of two complete optical systems, each system comprising a field lens, a series of reflectors, an image forming lens, and a fulcrumed holder for said image forming lens having a straight inclined surface adapted, when extended, to pass through the fulcrum of said holder, the field lenses of both systems being adjacent to each other, and brackets fastened to said back part, each having a knife edge adapted to engage the inclined surface of one of said holders, said brackets and holders cooperating to form a beam deviating device in each optical system for focusing purposes.

2. In a photographic camera, a front part and a back part adjustable with respect to each other, a camera lens fastened to said front part, a combination range and view finder fastened to said front part consisting of two complete optical systems, each system comprising a field lens, a series of reflectors, and an image forming lens, the field lenses of both systems being adjacent to each other, a beam deviating device in one of the said systems comprising a fulcrumed holder for the image forming lens, said holder having a straight inclined surface adapted, when extended, to pass through the fulcrum of said holder, and a bracket fastened to said back part and having a knife edge adapted to engage said inclined surface of the holder for focusing purposes.

3. In a photographic camera, a front part and a back part adjustable with respect to each other, a camera lens fastened to said front part, a combination range and view finder fastened to one of the two camera parts consisting of two complete optical systems, each system comprising a field lens, a series of reflectors, an image forming lens, and a fulcrumed holder for said image forming lens having a straight inclined surface adapted, when extended, to pass through the fulcrum of said holder, the field lenses of both systems being adjacent to each other, and brackets fastened to the other of the two camera parts, each bracket having a knife edge adapted to engage the inclined surface of one of said holders, said brackets and holders cooperating to form a beam deviating device in each optical system for focusing purposes.

4. In a photographic camera, a front part and a back part adjustable with respect to each other, a camera lens fastened to said front part, a combination range and view finder fastened to one of the two camera parts consisting of two complete optical systems, each system comprising a field lens, a series of reflectors, and an image forming lens, the field lenses of both systems being adjacent to each other, a beam deviating device in one of the said systems comprising a fulcrumed holder for the image forming lens, said holder having a straight inclined surface adapted, when extended, to pass through the fulcrum of said holder, and a bracket fastened to the other of the two camera parts and having a knife edge adapted to engage said inclined surface of the holder for focusing purposes.

5. In a photographic camera, a front part and a back part adjustable with respect to each other, a camera lens fastened to said front part, a combination range and view finder fastened to said front part consisting of two complete optical systems, each system comprising a field lens, a series of reflectors, an image forming lens, and a fulcrumed holder for said image forming lens having an inclined surface, the field lenses of both systems being adjacent to each other, and brackets fastened to said back part, each bracket having a knife edge adapted to engage the inclined surface of one of said holders, said brackets and holders cooperating to form a beam deviating device in each optical system for focusing purposes, the proportions of the beam deviating device being such as to satisfy the following formulae:

$$\tang \beta = \frac{f}{r}\left(\frac{m}{F+c}\right)$$

and $$L = \frac{r}{f} \cdot \frac{F^2}{m} \cdot \sin \beta$$

in which $\beta$=the angle between the inclined surface of the holder and a line parallel to the optical axis of the camera lens in the infinity position, $f$=the effective focal length of the image forming lens making due allowances for the magnification by the field lens, $r$=the distance between the fulcrum of the holder and the center of the image forming lens, $m$=the distance between the optical center of the camera lens and the center line of one beam of light entering the finder, $F$=the focal length of the camera lens, $c$=the distance by which the image plane of the image finder lenses would be behind the optical center of the camera lens if the reflective system of the finder were temporarily omitted, and $L$=the distance from the fulcrum of the holder to the supporting knife edge in the infinity position.

6. In a photographic camera, a front part and a back part adjustable with respect to each other, a camera lens fastened to said front part, a combination range and view finder fastened to said front part consisting of two complete optical systems, each system comprising a field lens, a series of reflectors, and an image forming lens, the field lenses of both systems being adjacent to each other, a beam deviating device in one of the said systems comprising a fulcrumed holder for the image forming lens, said holder having an inclined surface, and a bracket fastened to said back part and having a knife edge adapted to engage said inclined surface of the holder for focusing purposes, the proportions of the beam deviating device being such as to satisfy the following formulae:

$$\tang \beta = \frac{f}{r}\left(\frac{m}{F+c}\right)$$

and $$L = \frac{r}{f} \cdot \frac{F^2}{m} \cdot \sin \beta$$

in which $\beta$=the angle between the inclined surface of the holder and a line parallel to the optical axis of the camera lens in the infinity position, $f$=the effective focal length of the image forming lens making due allowances for the magnification by the field lens, $r$=the distance between the fulcrum of the holder and the center of the image forming lens, $m$=the distance between the two beams of light entering the finder, $F$=the focal length of the camera lens, $c$=the distance by which the image plane of the image finder lens would be behind the optical center of the camera lens if the reflective system of the finder were temporarily omitted, and L = the distance from the fulcrum of the holder to the supporting knife edge in the infinity position.

7. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other and in substantially the same horizontal plane, a cut-off side of the field lens in one system contacting a cut-off side of the field lens in the other system forming a stationary parting line, both systems adapted to be viewed through said field lenses from a normal reading distance simultaneously with both eyes of an observer.

8. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane and of the same focal length, a cut-off side of the field lens in one system contacting a cut-off side of the field lens in the other system forming a stationary parting line, both systems adapted to be viewed through said field lenses from a normal reading distance simultaneously with both eyes of an observer.

9. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane, a cut-off slide of the field lens in one system contacting a cut-off side of the field lens in the other system forming a stationary parting line, and the image forming lenses of both systems being of the same focal length, both systems adapted to be viewed through said field lenses from a normal reading distance simultaneously with both eyes of an observer.

10. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane, a cut-off side of the field lens in one system contacting a cut-off side of the field lens in the other system forming a stationary parting line, and the two pencils of rays in each system being of the same length, both systems adapted to be viewed through said field lenses from a normal reading distance simultaneously with both eyes of an observer.

11. In a photographic camera, a combination range and view finder of the Brilliant type, means for producing two supplementary part images of the object to be photographed having a stationary parting line between them consisting of two complete optical systems, each system comprising for each part image a field lens arranged in substantially horizontal plane, each field lens being positive having at least on spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane and of the same focal length, a cut-off side of the field lens in one system contacting a cut-off side of the field lens in the other system forming a stationary parting line, and the two pencils of rays in each system being of the same length, both systems adapted to be viewed through said field lenses from a normal reading distance simultaneously with both eyes of an observer.

12. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane and of the same focal length, a cut-off side of the field lens in one system contacting a cut-off side of the field lens in the other system forming a stationary parting line, and the image forming lenses of both systems being of the same focal length, both systems adapted to be viewed through said field lenses from a normal reading distance simultaneously with both eyes of an observer.

13. In a photographic camera, a combination range and view finder of the Brilliant type, means for producing two supplementary part images of the object to be photographed having a stationary parting line between them consisting of two complete optical systems, each system comprising for each part image a field lens arranged in a substantially horizontal plane, each field lens being positive having at least one spherical surface and having at least one side cut off, a series of reflectors at angles of approximately 45 degrees to and underneath the field lens, an image forming lens interposed in the passage of rays between said field lens and reflectors, the field lenses of both systems being adjacent to each other in substantially the same horizontal plane and of the same focal length, a cut-off side of the field lens in one system contacting a cut-off side of the field lens in the other system forming a stationary parting line, the image forming lenses of both systems being of the same focal length, and the two pencils of rays in each system being of the same length, both systems adapted to be viewed through said field lenses from a normal reading distance simultaneously with both eyes of an observer.

ALFRED SIMMON.